United States Patent
Lin et al.

(10) Patent No.: US 12,107,630 B2
(45) Date of Patent: Oct. 1, 2024

(54) OPTICAL NETWORK METHOD AND APPARATUS OF THE SAME

(71) Applicant: REALTEK SEMICONDUCTOR CORPORATION, Hsinchu (TW)

(72) Inventors: Hung-Wen Lin, Hsinchu (TW); Mu-Jung Hsu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 755 days.

(21) Appl. No.: 17/330,326

(22) Filed: May 25, 2021

(65) Prior Publication Data
US 2022/0006531 A1 Jan. 6, 2022

(30) Foreign Application Priority Data
Jul. 6, 2020 (TW) .................. 109122809

(51) Int. Cl.
*H04B 10/50* (2013.01)
*H04B 10/508* (2013.01)
*H04B 10/516* (2013.01)
*H04Q 11/00* (2006.01)

(52) U.S. Cl.
CPC ......... *H04B 10/503* (2013.01); *H04B 10/508* (2013.01); *H04B 10/516* (2013.01); *H04Q 11/0067* (2013.01)

(58) Field of Classification Search
CPC .. H04B 10/272; H04B 10/503; H04B 10/508; H04B 10/516; H04Q 11/0067; H04Q 2011/0064; H04Q 2011/0088
See application file for complete search history.

(56) References Cited

U.S. PATENT DOCUMENTS

| | | | | |
|---|---|---|---|---|
| 5,107,275 A | * | 4/1992 | Tsuruoka | H04N 1/036 347/247 |
| 5,121,160 A | * | 6/1992 | Sano | G03F 7/70058 355/71 |
| 5,383,217 A | * | 1/1995 | Uemura | G03F 7/70025 372/33 |
| 5,519,431 A | * | 5/1996 | Kusano | H04N 1/40037 347/247 |
| 7,929,127 B2 | * | 4/2011 | Watanabe | G01J 1/04 219/121.37 |

(Continued)

FOREIGN PATENT DOCUMENTS

| | | |
|---|---|---|
| CN | 110943782 A | 3/2020 |
| TW | 201031140 A1 | 8/2010 |

OTHER PUBLICATIONS

Yongmao Frank Chang,"Uplink burst-mode transmissions using EPON physical-layer chipset for broadband optical Ethernet access networks," Jun. 26, 2007,Journal of Optical Networking,vol. 6,No. 7,Jul. 2007,pp. 937-945.*

(Continued)

*Primary Examiner* — Omar S Ismail
(74) *Attorney, Agent, or Firm* — WPAT, P.C.; Anthony King

(57) ABSTRACT

The present application provides an optical network method and associated apparatus. The method includes: receiving uplink burst time assignment information; and enabling or disabling a laser module of a local end according to the uplink burst time assignment information.

18 Claims, 4 Drawing Sheets

(56) References Cited

U.S. PATENT DOCUMENTS

| | | | | |
|---|---|---|---|---|
| 8,208,815 B1* | 6/2012 | Chiang | H04J 3/0694 | 398/155 |
| 2004/0141695 A1* | 7/2004 | Miller | H04B 10/564 | 385/88 |
| 2006/0291510 A1* | 12/2006 | Juluri | H01S 5/0683 | 372/29.011 |
| 2007/0012665 A1* | 1/2007 | Nelson | B23K 26/40 | 219/121.68 |
| 2009/0110398 A1* | 4/2009 | Pfeiffer | H04B 10/272 | 398/63 |
| 2009/0110403 A1* | 4/2009 | Kramer | H04Q 11/0067 | 398/98 |
| 2009/0310961 A1* | 12/2009 | Bowler | H04B 10/0799 | 398/38 |
| 2010/0098413 A1* | 4/2010 | Li | H04Q 11/0067 | 714/751 |
| 2011/0038629 A1* | 2/2011 | Johansson | H04J 3/0682 | 398/58 |
| 2011/0044683 A1* | 2/2011 | Trojer | H04J 3/14 | 398/1 |
| 2012/0020662 A1* | 1/2012 | Ding | H04J 3/1694 | 398/38 |
| 2012/0176667 A1* | 7/2012 | He | H04B 10/2942 | 359/344 |
| 2013/0114962 A1* | 5/2013 | Oka | H04J 14/00 | 398/67 |
| 2013/0336651 A1* | 12/2013 | Bato | H04B 10/564 | 398/38 |
| 2014/0119396 A1* | 5/2014 | Dvir | H04B 10/00 | 372/38.02 |
| 2014/0294388 A1* | 10/2014 | Odaka | H04J 3/1694 | 398/66 |
| 2015/0092789 A1* | 4/2015 | Li | H04W 56/00 | 370/437 |
| 2015/0188627 A1* | 7/2015 | Yuda | H04B 10/541 | 398/30 |
| 2018/0062762 A1* | 3/2018 | Mun | H04B 10/69 | |
| 2018/0083713 A1* | 3/2018 | Shi | H04B 10/27 | |
| 2018/0183443 A1* | 6/2018 | Tebbe | A61K 45/06 | |
| 2018/0241471 A1* | 8/2018 | Khotimsky | H04B 10/077 | |
| 2018/0316456 A1* | 11/2018 | Tebbe | H04L 47/623 | |
| 2018/0351646 A1* | 12/2018 | Seo | H04J 3/062 | |
| 2019/0149255 A1* | 5/2019 | Pitzer | H04J 3/1694 | 398/98 |
| 2019/0178804 A1* | 6/2019 | Jean-Ruel | G02B 6/4215 | |
| 2019/0273975 A1* | 9/2019 | Lin | H04Q 11/0067 | |
| 2021/0168475 A1* | 6/2021 | Nishimoto | H04L 12/44 | |

OTHER PUBLICATIONS

Susumu Nishihara et al.,"A Burst-Mode 3R Receiver for 10-Gbit/s PON Systems With High Sensitivity, Wide Dynamic Range, and Fast Response,"Jan. 1, 2008,Journal of Lightwave Technology, vol. 26, No. 1,pp. 99-104.*

Verhulst, Dieter, et al. "Upstream experiments on the gigabit PON physical medium layer." Optical Fiber Communication Conference. Optica Publishing Group, 2005,pp. 1-2.*

Satoshi Yoshima et al.,"10 GB/s-Based PON Over OCDMA Uplink Burst Transmission Using SSFBG Encoder/Multi-Port Decoder and Burst-Mode Receiver," Oct. 9, 2009, Journal of Lightwave Technology, vol. 28, No. 4, Feb. 15, 2010, pp. 365-370.*

English abstract translation of CN110943782A.

English Abstract of TW201031140A1.

* cited by examiner

OPTICAL NETWORK METHOD AND APPARATUS OF THE SAME

CROSS REFERENCE TO RELATED APPLICATIONS

This application claims priority of Taiwan application No. 109122809 filed on Jul. 6, 2020, which is incorporated by reference in its entirety.

TECHNICAL FIELD

The present application relates to an optical network method; in particular, to an optical network method for controlling a laser module and device of the same.

BACKGROUND

The uplink transmission of a passive optical network (PON) system uses a time-division multiplexing mechanism, in which the optical line terminal (OLT) assigns different optical network units (ONUs) at different times to occupy the fiber to transmit the uplink data; at this time, the remaining ONUs cannot transmit signals; otherwise, it will cause interference. In the current PON system, only the OLT can control whether the transmitting terminal of the ONU enters the power-saving mode, and if the OLT does not support this function, the power consumption of the ONU cannot be reduced.

SUMMARY OF THE INVENTION

Some embodiments of the present disclosure provides an optical network method, including: receiving uplink burst time assignment information from a far end; and enabling or disabling a laser module of a local end according to the uplink burst time assignment information.

Some embodiments of the present disclosure provides an optical network device, configured to control a laser module at a local end, wherein the optical network device includes: a storage unit, configured to store uplink burst time assignment information received from a far end; and a control unit, configured to enable or disable the laser module according to the uplink burst time assignment information.

The above mentioned method and device can reduce the power consumption of the ONU without affecting the performance.

DETAILED DESCRIPTION

The present application discloses a method and a related system that allow the optical network unit (ONU) in a passive optical network (PON) to actively determines whether to turn off the laser module regardless whether the optical line terminal (OLT) supports the power-saving mode. In this way, the power consumption of the ONU can be reduced.

Figure 1:
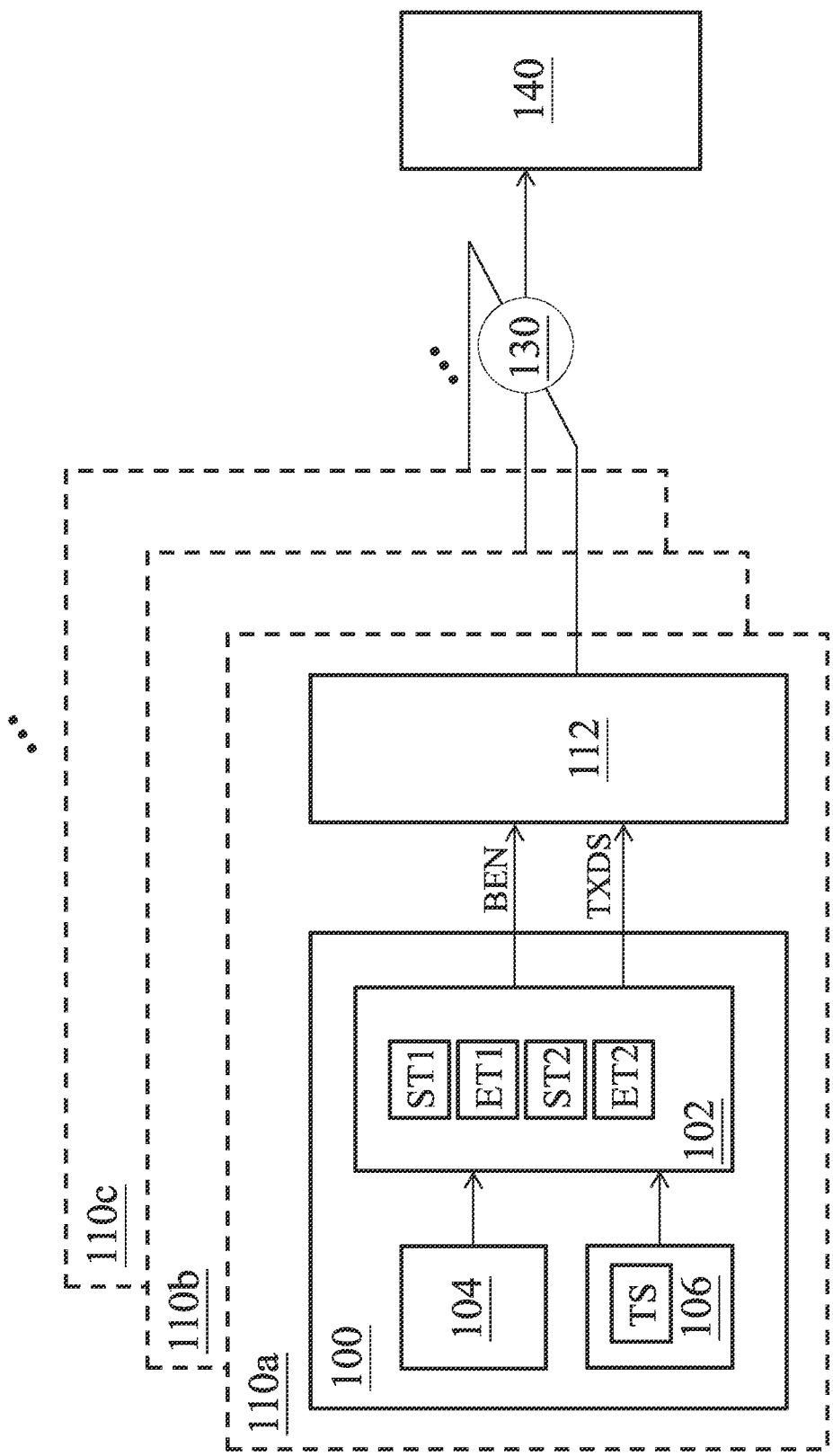
FIG. 1 is a schematic diagram illustrating the PON system according to the present application.

FIG. 1 is a schematic diagram of a PON system according to the present application. A plurality of ONUs 110a, 110b, 110c, . . . shown in FIG. 1 are connected to the our 140 through the optical fiber and a splitter 130. The OLT 140 actively broadcasts the uplink burst time assignment information to the plurality of ONUs 110a, 110b, 110c, . . . , so that the plurality of ONUs 110a, 1.10b, 110c, . . . carry out the uplink transmission by using the time-division multiplexing mechanism. For example, in a gigabit passive optical network (GPON) system, the uplink burst time assignment information is configured in the bandwidth map (BWmap) field; whereas in an Ethernet passive optical network (EPON) system, the uplink burst time assignment information is configured in the grant field.

Each of the plurality of ONUs 110b, 110c, . . . has the same function and structure, and hence, the ONU 110a is taken as an example. The ONU 110a includes an optical network device 100 and a laser module 112. When the ONU 110a receives the uplink burst time assignment information, it stores the same in a storage unit 104, so that the control unit 102 can generate a signal BEN for controlling the opening and closing of the mask of the laser module 112, and generate a signal TXDS for enabling or disabling the laser module 112, according to the uplink burst time assignment information. Specifically, when the mask of the laser module 112 is closed, the light signal emitted by the laser module 112 would be shielded and the OLT 140 cannot receive the light signal. Further, the power consumption of the laser module 112 that is disabled is far less than the power consumption of the laser module 112 that is enabled.

Specifically, the uplink burst time assignment information records a plurality of time points that the OLT 140 assigns to the plurality of ONUs 110a, 110b, 110c, . . . regarding the time for carrying out the uplink burst transmission; hence, when the ONU 110a receives the uplink burst time assignment information, it will store start time and end time of a plurality of uplink bursts assigned to the ONU 110a in the storage unit 104; such as the start time and end time of a first burst, the start time and end time of a second burst, the start time and end time of a third burst, and so on. The control unit 102 will read the start time and end time of the two bursts to be transmitted at the most recent time points, wherein the start time and the end time of the first burst to be transmitted are set as ST1 and ET1, respectively; and the start time and the end time of the burst to be transmitted next to the first burst are set as ST2 and ET2, respectively.

The signal BEN of the control unit 102 controls the mask of the laser module 112 so that the mask opens between ST1 and ET1, closes between ET1 and ST2, and then opens between ST2 and ET2; in this way, the uplink burst can be seen by the OLT 140. In the meantime, the masks of the laser modules in the other ONUs (like ONUs 110b, 110c, . . . ) other than the ONU 110a will close in accordance with the uplink burst time assignment information, so as to prevent unwanted signals from entering the splitter 130 and interfering the uplink burst of the ONU 110a.

However, because after the laser module 112 is enabled from the disabled state, it still needs a certain switch-on time before it operates normally; hence, the signal TXDS of the control unit 102 cannot enable or disable the laser module 112 in the same way as the signal BEN. In the present embodiment, the optical network device 100 further includes another storage unit 106, which is configured to records the specific time TS, wherein the user may predetermined the specific time TS according to the characteristics of the laser module 112 under the control of the optical network device 100; for example, the specific time TS may be set as the switch-on time of the laser module 112 under the control of the optical network device 100. For instance, when the laser module 112 in the ONU 110a is replaced with a laser module of a different brand, one should confirm whether the specific time TS recorded by the storage unit 106 shall be reset to another value. The user may also periodically confirm whether the specific time TS recorded by the storage unit 106 shall be reset according to the aging condition of the laser module 112.

Figure 2:
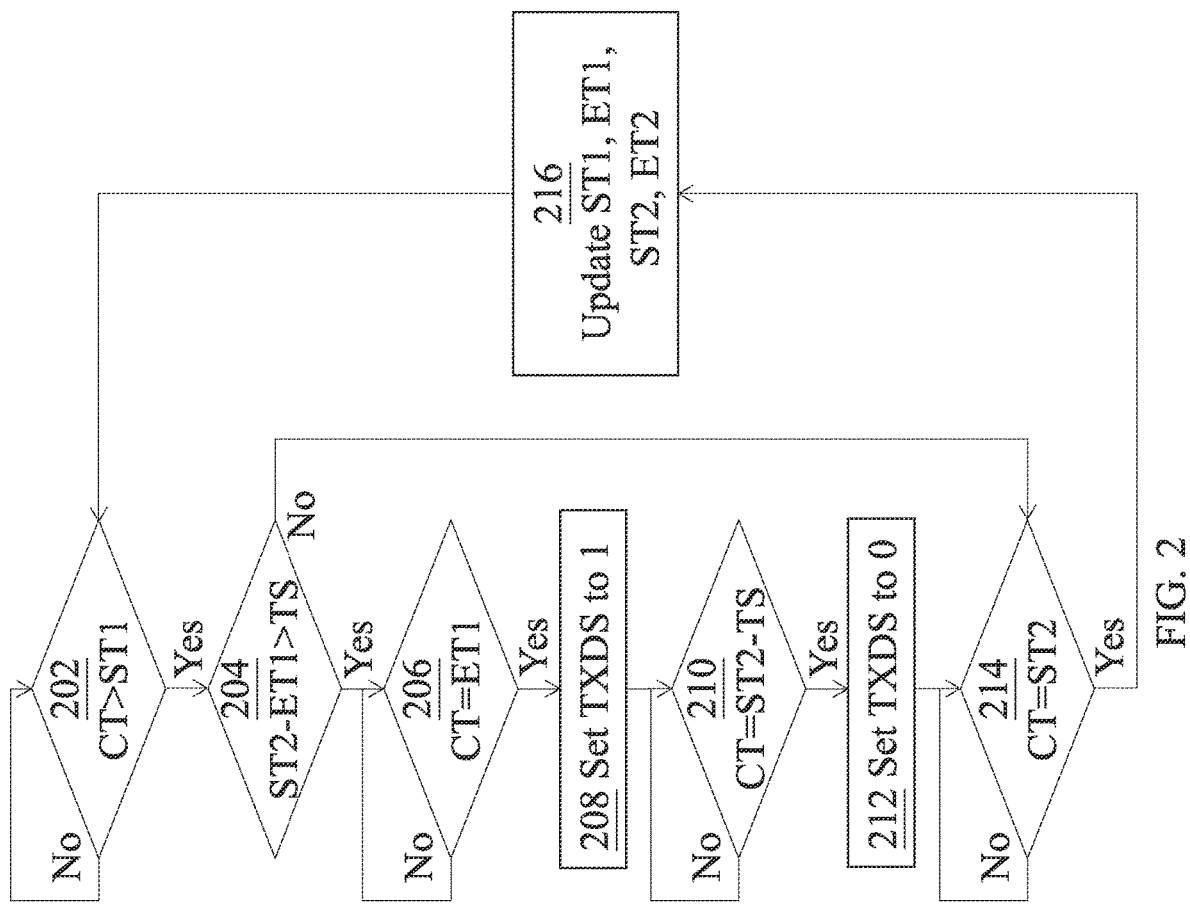
FIG. 2 is a flow chart illustrating the process that an optical network device uses to control the enabling or disabling of a laser module according to embodiments of the present disclosure.
Figure 3:
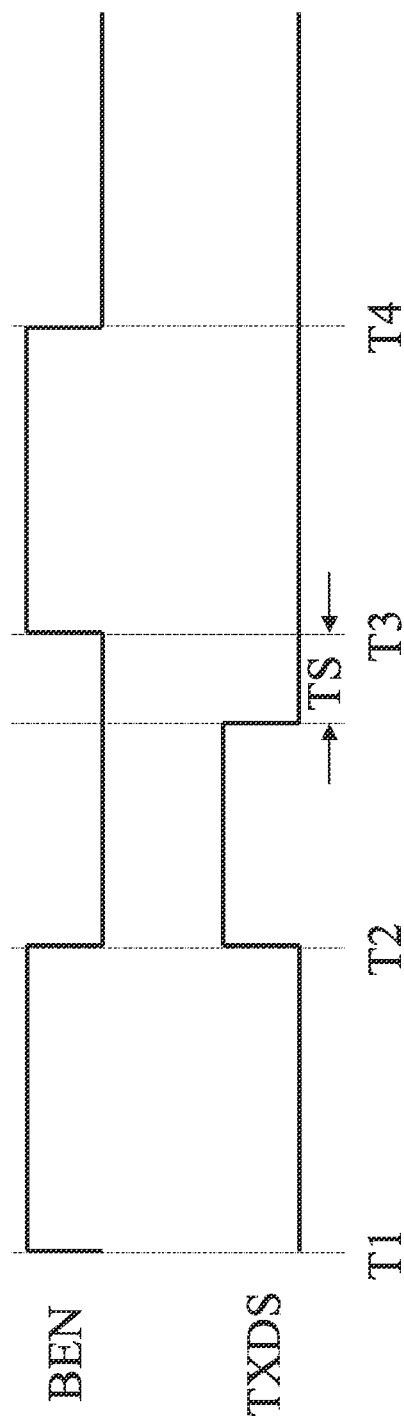
FIG. 3 shows a first example of the signals BEN and TXDS generated according to the method of FIG. 2.

Reference is made to both FIG. 2 and FIG. 3; FIG. 2 is a flow chart illustrating the embodiment of a process that the optical network device of the present application uses to control the enabling or disabling of a laser module. FIG. 3 shows a first example of the signals BEN and TXDS generated according to the method of FIG. 2. In Step 202, the ST1, ET1, ST2 and ET2 of the control unit 102 at the local end are time points T1, T2, T3 and T4, respectively; when the current time CT has passed the ST1, which means that the current uplink burst is being transmitted to the far end (i.e., the OLT 140), the process proceeds to Step 204. In Step 204, the control unit 102 determines whether the ST2-ET1 is longer than the specific time TS; that is, it determines whether the time length between the end of the current burst and the beginning of the next burst is longer than the specific time TS. In this case, since the T3-T2 shown in FIG. 3 is longer than the TS, the process proceeds to Step 206, and when the current time CT comes to the ET1 (that is, the end of the current burst). Next, the process proceeds to Step 208, in which the control unit 102 sets the signal TADS as 1 to disable the laser module 112 and then the process proceeds to Step 210.

When the current time CT comes to ST2-TS, since there is only a specific time TS left from the start time of the next burst, the laser module 112 should be enabled. Hence, the process proceeds to Step 212, in which the TXDS is set as 0, so as to enable the laser module 112. The process then proceeds to Step 214 and wait until the current time CT reaches the ST2. Next, the process proceeds to Step 216 to update the ST1, ET1, ST2 and ET2 of the control unit 102, wherein the T3 is set as the ST1, the T4 is set as the ET1, and the storage unit 104 is read to obtain the start time and end time of the burst thereafter, which are set as the ST2 and ET2, respectively, and then the process returns to Step 202.

Figure 4:
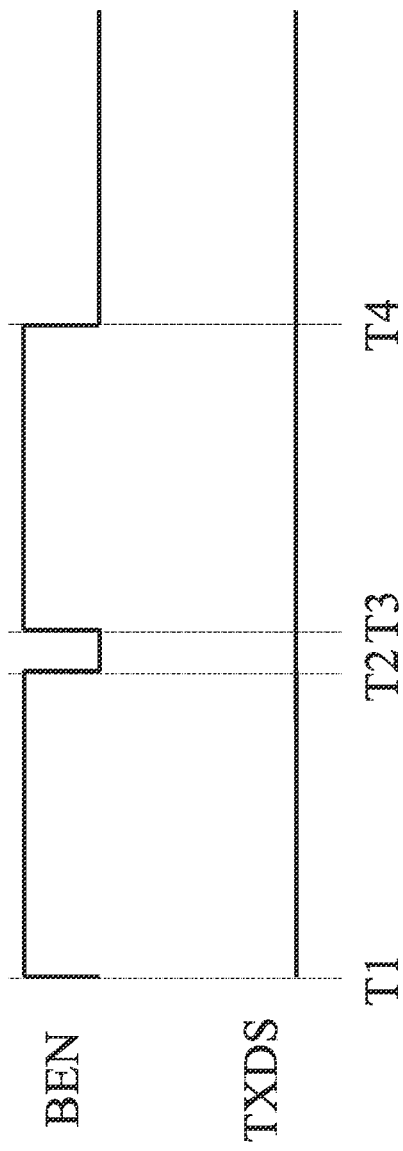
FIG. 4 shows a second example of the signals BEN and TXDS generated according to the method of FIG. 2.

FIG. 4 shows a second example of the signals BEN and TXDS generated according to the method of FIG. 2. The second example differs from the one showed in FIG. 3 in that the interval between the two bursts shown in the second example is less than the specific time TS, and hence, there is no sufficient to disable and then enable the laser module 112 during such interval. Reference is made to both FIG. 2 and FIG. 4; in Step 204, the control unit 102 determines that the ST2-ET1 is less than the specific time TS, and hence the process proceeds directly to Step 214, and waits for the current time CT to reach the ST2; thereafter, the process proceeds to Step 216, so as to update the ST1, ET1, ST2 and ET2 of the control unit 102. The process then returns to Step 202 without disabling the laser module 112 during the process.

Table 1 summarizes the time ratio (TXDS time ratio) at which the laser module 112 enters the disabled state under the control of the optical fiber network device 100 when the PON system of the present application is under different uplink bit-rates. It should be noted that the data in Table 1 is obtained when the OLT 140 does not perform the power-saving control on the laser module 112. As can be seen from Table 1, the lower the uplink transmission rate, the more time the laser module 112 get to be disabled.

TABLE 1

| ONU uplink transmission rate (Mb/s) | Burst size (us) | Burst interval (us) | TS (us) | TXDS time ratio (%) |
| --- | --- | --- | --- | --- |
| Idle | 2,464 | 16,774,752 | 200 | 0.999841213 |
| 10 | 18,464 | 1,735,072 | 200 | 0.989356363 |
| 100 | 27,456 | 245,824 | 200 | 0.898799766 |
| 500 | 127,456 | 118,912 | 200 | 0.481848292 |
| 1,000 | 133,536 | 512 | 200 | 0.002327524 |

Therefore, when the ONUs 110a, 110b, 110c of the present application are configured in an OLT 140 that does not support or does not turn on the power-saving function, the laser module 112 can be actively enabled or disabled to reduce power consumption. If the OLT 140 supports and enables the power-saving function, the ONUs 110a, 110b, and 110c of this application can further reduce the power consumption.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:
1. An optical network method, comprising:
receiving uplink burst time assignment information from a far end;
enabling or disabling a laser module of a local end according to the uplink burst time assignment information; and
controlling opening or closing of a mask of the laser module according to the uplink burst time assignment information,
wherein when the mask of the laser module is closed, a light signal emitted by the laser module is shielded.
2. The method of claim 1, wherein the uplink burst time assignment information records a first start time and a first end time of a first burst, and a second start time and a second end time of a second burst.
3. The method of claim 2, wherein the step of enabling or disabling the laser module comprises:
enabling or disabling the laser module according to the uplink burst time assignment information to transmit the first burst and the second burst.
4. The method of claim 3, wherein the step of enabling or disabling the laser module comprises:

disabling the laser module starting from the first end time, wherein a time difference between the second start time and the first end time is longer than a specific time.

5. The method of claim 4, wherein the specific time is time taken for the laser module to operate normally after being enabled from a disabled state.

6. The method of claim 5, wherein the step of enabling or disabling the laser module comprises:
enabling the laser module at a second pre-start time, wherein the second pre-start time is later than the first end time and earlier than the second start time, and a time difference between the second pre-start time and the second start time is not less than the specific time.

7. The method of claim 2, wherein the step of controlling the opening or closing of the mask of the laser module comprises:
controlling the mask of the laser module to open between the first start time and the first end time and between the second start time and the second end time; and
controlling the mask of the laser module to close between the first end time and the second start time.

8. The method of claim 1, wherein the far end is a gigabit passive optical network optical line terminal, and the uplink burst time assignment information is configured in a bandwidth map field.

9. The method of claim 1, wherein the far end is an Ethernet passive optical network optical line terminal, and the uplink burst time assignment information is configured in a grant field.

10. An optical network device, configured to control a laser module at a local end, wherein the optical network device comprises:
a storage unit, configured to store uplink burst time assignment information received from a far end; and
a control unit, configured to enable or disable the laser module according to the uplink burst time assignment information,
wherein the control unit is further configured to control opening or closing of a mask of the laser module according to the uplink burst time assignment information,
wherein when the mask of the laser module is closed, a light signal emitted by the laser module is shielded.

11. The device of claim 10, wherein the uplink burst time assignment information records a first start time and a first end time of a first burst, and a second start time and a second end time of a second burst.

12. The device of claim 11, wherein the control unit enables or disables the laser module according to the uplink burst time assignment information to transmit the first burst and the second burst.

13. The device of claim 12, wherein the control unit disables the laser module starting from the first end time, wherein a time difference between the second start time and the first end time is longer than a specific time.

14. The device of claim 13, the specific time is time taken for the laser module to operate normally after being enabled from a disabled state.

15. The device of claim 14, wherein the control unit enables the laser module at a second pre-start time, wherein the second pre-start time is later than the first end time and earlier than the second start time, and a time difference between the second pre-start time and the second start time is not less than the specific time.

16. The device of claim 11, wherein the control unit controls the mask of the laser module to open between the first start time and the first end time and between the second start time and the second end time; and controls the mask of the laser module to close between the first end time and the second start time.

17. The device of claim 10, wherein the far end is a gigabit passive optical network optical line terminal, and the uplink burst time assignment information is configured in a bandwidth map field.

18. The device of claim 10, wherein the far end is an Ethernet passive optical network optical line terminal, and the uplink burst time assignment information is configured in a grant field.

* * * * *